(12) United States Patent
Boka et al.

(10) Patent No.: US 8,378,880 B1
(45) Date of Patent: Feb. 19, 2013

(54) EXPLICIT PROBABILISTIC TARGET OBJECT SELECTION AND ENGAGEMENT

(75) Inventors: Jeffrey B. Boka, Lumberton, NJ (US); Naresh Raman Patel, Mullica Hill, NJ (US); Joseph P. Tadduni, Medford, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 13/243,162

(22) Filed: Sep. 23, 2011

(51) Int. Cl.
*G01S 13/00* (2006.01)
*F41G 7/00* (2006.01)

(52) U.S. Cl. ............ 342/53; 342/52; 342/175; 244/3.1; 244/3.15; 244/3.16; 244/3.19

(58) Field of Classification Search .................. 342/52, 342/53, 94–97, 175, 195; 244/3.1, 3.15, 244/3.16, 3.17, 3.19
See application file for complete search history.

(56) References Cited

U.S. PATENT DOCUMENTS

| | | | | |
|---|---|---|---|---|
| 3,724,783 A * | 4/1973 | Nolan et al. | ................. | 244/3.15 |
| 4,317,117 A * | 2/1982 | Chasek | ........................... | 342/53 |
| 4,817,495 A * | 4/1989 | Drobot | .......................... | 89/1.11 |
| 5,062,056 A * | 10/1991 | Lo et al. | ....................... | 235/411 |
| 5,107,271 A * | 4/1992 | White | ......................... | 342/195 |
| 5,144,316 A * | 9/1992 | Uhlmann et al. | ............. | 342/189 |
| 5,317,319 A * | 5/1994 | Fagarasan et al. | .............. | 342/53 |
| 5,323,987 A * | 6/1994 | Pinson | ......................... | 244/3.16 |
| 5,340,056 A * | 8/1994 | Guelman et al. | ............. | 244/3.16 |
| 5,365,236 A * | 11/1994 | Fagarasan et al. | .............. | 342/53 |
| 5,611,502 A * | 3/1997 | Edlin et al. | .................... | 244/3.16 |
| 6,877,691 B2 * | 4/2005 | DeFlumere et al. | ......... | 244/3.16 |
| 7,032,858 B2 * | 4/2006 | Williams | ..................... | 244/3.15 |
| 7,236,121 B2 * | 6/2007 | Caber | ............................. | 342/62 |
| 7,256,729 B2 * | 8/2007 | Bummerstede | ................. | 342/59 |
| 7,548,194 B2 * | 6/2009 | Wood | ............................ | 342/195 |
| 7,576,681 B2 * | 8/2009 | Chen et al. | ..................... | 342/52 |
| 7,875,837 B1 * | 1/2011 | Szabo et al. | ................. | 244/3.15 |
| 8,115,148 B1 * | 2/2012 | Boardman et al. | ........... | 244/3.14 |
| 2003/0184468 A1 * | 10/2003 | Chen et al. | ..................... | 342/52 |
| 2006/0082490 A1 * | 4/2006 | Chen et al. | ..................... | 342/52 |
| 2006/0238403 A1 * | 10/2006 | Golan et al. | .................... | 342/62 |

* cited by examiner

*Primary Examiner* — Jack W Keith
*Assistant Examiner* — Peter Bythrow
(74) *Attorney, Agent, or Firm* — Howard IP Law Group, PC

(57) ABSTRACT

An object of interest in a cloud of objects is identified by RF and IR sensing. The RF and IR signals are separately discriminated to determine the probability that the RF tracked object is one of a predetermined number of possible object types, and the IR tracked object is one of the possible object types. Joint probabilities are calculated for all pairs of RF and IR signals and all objects, and the joint probabilities are normalized. Marginal probabilities of the joint RF/IR discrimination results are calculated to produce a vector set of marginal optical probabilities. The vector set is normalized over all object types to thereby produce a vector set of normalized marginal optical probabilities. The object of interest is selected to be the IR object of said vector set of normalized joint optical probabilities with the highest probability of being the object type of interest.

17 Claims, 7 Drawing Sheets

RF/IR Correlation Matrix

|  | IR_Obj #1 | IR_Obj #2 | IR_Obj #3 | IR_Obj #4 |
|---|---|---|---|---|
| RF_Obj #1 | 0.01 | 0.01 | 0.01 | 0.99 |
| RF_Obj #2 | 0.89 | 0.01 | 0.01 | 0.01 |
| RF_Obj #3 | 0.01 | 0.01 | 0.89 | 0.01 |

IR Confusion Matrix

|  | 01 | 02 | 03 | 04 | 05 | 06 <= Object Types |
|---|---|---|---|---|---|---|
| IR_Obj #1 | 0.05 | 0.05 | 0.84 | 0.02 | 0.02 | 0.02 |
| IR_Obj #2 | 0.15 | 0.15 | 0.10 | 0.25 | 0.25 | 0.10 |
| IR_Obj #3 | 0.02 | 0.02 | 0.02 | 0.84 | 0.05 | 0.05 |
| IR_Obj #4 | 0.84 | 0.05 | 0.05 | 0.02 | 0.02 | 0.02 |

RF Confusion Matrix

|  | 01 | 02 | 03 | 04 | 05 | 06 <= Object Types |
|---|---|---|---|---|---|---|
| RF_Obj #1 | 0.95 | 0.01 | 0.01 | 0.01 | 0.01 | 0.01 |
| RF_Obj #2 | 0.01 | 0.01 | 0.95 | 0.01 | 0.01 | 0.01 |
| RF_Obj #3 | 0.01 | 0.01 | 0.01 | 0.95 | 0.01 | 0.01 |

Fused RF/IR Results (EXPOSES Output)

|  | 01 | 02 | 03 | 04 | 05 | 06 <= Object Types |
|---|---|---|---|---|---|---|
| IR_Obj #1 | 0.04 | 0.04 | 0.89 | 0.01 | 0.01 | 0.01 |
| IR_Obj #2 | 0.15 | 0.15 | 0.10 | 0.25 | 0.25 | 0.10 |
| IR_Obj #3 | 0.01 | 0.01 | 0.01 | 0.89 | 0.04 | 0.04 |
| IR_Obj #4 | 0.89 | 0.03 | 0.03 | 0.01 | 0.01 | 0.01 |

FIG. 5

RF/IR Correlation Matrix

|  | IR_Obj #1 | IR_Obj #2 | IR_Obj #3 | IR_Obj #4 |
|---|---|---|---|---|
| RF_Obj #1 | 0.01 | 0.01 | 0.01 | 0.99 |
| RF_Obj #2 | 0.89 | 0.01 | 0.01 | 0.01 |
| RF_Obj #3 | 0.01 | 0.01 | 0.89 | 0.01 |

IR Confusion Matrix

|  | 01 | 02 | 03 | 04 | 05 | 06 | <= Object Types |
|---|---|---|---|---|---|---|---|
| IR_Obj #1 | 0.25 | 0.25 | 0.25 | 0.10 | 0.10 | 0.05 | |
| IR_Obj #2 | 0.15 | 0.15 | 0.15 | 0.15 | 0.15 | 0.25 | |
| IR_Obj #3 | 0.15 | 0.15 | 0.10 | 0.25 | 0.25 | 0.10 | |
| IR_Obj #4 | 0.25 | 0.25 | 0.25 | 0.10 | 0.10 | 0.05 | |

RF Confusion Matrix

|  | 01 | 02 | 03 | 04 | 05 | 06 | <= Object Types |
|---|---|---|---|---|---|---|---|
| RF_Obj #1 | 0.95 | 0.01 | 0.01 | 0.01 | 0.01 | 0.01 | |
| RF_Obj #2 | 0.01 | 0.01 | 0.95 | 0.01 | 0.01 | 0.01 | |
| RF_Obj #3 | 0.01 | 0.01 | 0.01 | 0.95 | 0.01 | 0.01 | |

Fused RF/IR Results (EXPOSES Output)

|  | 01 | 02 | 03 | 04 | 05 | 06 | <= Object Types |
|---|---|---|---|---|---|---|---|
| IR_Obj #1 | 0.20 | 0.20 | 0.41 | 0.08 | 0.08 | 0.04 | |
| IR_Obj #2 | 0.15 | 0.15 | 0.15 | 0.15 | 0.15 | 0.25 | |
| IR_Obj #3 | 0.12 | 0.12 | 0.08 | 0.41 | 0.20 | 0.08 | |
| IR_Obj #4 | 0.48 | 0.17 | 0.17 | 0.07 | 0.07 | 0.03 | |

FIG. 6

RF/IR Correlation Matrix

|          | IR_Obj #1 | IR_Obj #2 | IR_Obj #3 | IR_Obj #4 |
|----------|-----------|-----------|-----------|-----------|
| RF_Obj #1 | 0.01 | 0.01 | 0.01 | 0.99 |
| RF_Obj #2 | 0.89 | 0.01 | 0.01 | 0.01 |
| RF_Obj #3 | 0.01 | 0.01 | 0.89 | 0.01 |

IR Confusion Matrix

|          | 01 | 02 | 03 | 04 | 05 | 06 <= Object Types |
|----------|------|------|------|------|------|------|
| IR_Obj #1 | 0.25 | 0.25 | 0.25 | 0.10 | 0.10 | 0.05 |
| IR_Obj #2 | 0.15 | 0.15 | 0.15 | 0.15 | 0.15 | 0.25 |
| IR_Obj #3 | 0.15 | 0.15 | 0.10 | 0.25 | 0.25 | 0.10 |
| IR_Obj #4 | 0.25 | 0.25 | 0.25 | 0.10 | 0.10 | 0.05 |

RF Confusion Matrix

|          | 01 | 02 | 03 | 04 | 05 | 06 <= Object Types |
|----------|------|------|------|------|------|------|
| RF_Obj #1 | 0.15 | 0.15 | 0.15 | 0.15 | 0.15 | 0.25 |
| RF_Obj #2 | 0.01 | 0.01 | 0.95 | 0.01 | 0.01 | 0.01 |
| RF_Obj #3 | 0.15 | 0.15 | 0.15 | 0.15 | 0.15 | 0.25 |

Fused RF/IR Results (EXPOSES Output)

|          | 01 | 02 | 03 | 04 | 05 | 06 <= Object Types |
|----------|------|------|------|------|------|------|
| IR_Obj #1 | 0.20 | 0.20 | 0.41 | 0.08 | 0.08 | 0.04 |
| IR_Obj #2 | 0.15 | 0.15 | 0.15 | 0.15 | 0.15 | 0.25 |
| IR_Obj #3 | 0.15 | 0.15 | 0.10 | 0.25 | 0.25 | 0.11 |
| IR_Obj #4 | 0.25 | 0.25 | 0.25 | 0.10 | 0.10 | 0.06 |

FIG. 7

EXPLICIT PROBABILISTIC TARGET OBJECT SELECTION AND ENGAGEMENT

STATEMENT OF GOVERNMENT INTEREST

This invention was made with Government support under Contract No. HQ0276-10-C-0001 awarded by the Missile Defense Agency (MDA). The Government has certain rights in this invention.

BACKGROUND OF THE INVENTION

Hostile intercontinental missiles can be expected to deploy decoy objects to conceal the warhead(s). The effectiveness of hit-to-kill based weapon systems against a target object of interest surrounded by decoy and other objects depends upon discriminating the object of interest from decoys and other objects of a "cloud." Discriminating this object of interest may involve the use of radar as a radio frequency (RF) sensor and the use of an interceptor missile fitted with a sensor such as an infrared (IR) tracker or sensor. The information from either the RF or the IR sensor is used to discriminate among the objects. Fusing discrimination information from both the RF and IR sensors increases the probability of discriminating and selecting the object of interest and thus improves the likelihood of successful engagement to negate the threat.

The challenges in this approach are to correlate the objects of the cloud as sensed by the separate sensors, and properly account for the resulting probability of correlation in the fused discrimination results. For example, if the probability of correlation is zero (i.e. objects from the RF sensor cannot be to corresponding objects from the IR sensor), the RF discrimination results cannot be trusted and the fused discrimination solution should only depend upon or use the IR discrimination results. Alternately, if the probability of correlation is non-zero, the fused discrimination results should be a blend of both the RF and IR discrimination results.

Many discrimination fusion systems are in use today, but they are primarily heuristic in nature and are based on a set of rules that govern how the discrimination results are fused given the number of objects in common between the sensors and the degree of confidence in the discrimination solutions from each sensor. The current correlation methodology for the Standard Missile-3 is based on such a rule set.

Improved or alternative real-time object selection systems based on multi-sensor discrimination and correlation are desired.

SUMMARY OF THE INVENTION

Thus, a method according to an aspect of the disclosure for selecting an object of interest in a cloud of objects of lesser interest comprises the steps of sensing objects of the cloud with an electromagnetic or radio-frequency (RF) sensor at a location, to thereby generate sensed RF signals for at least some of the objects of the cloud, and discriminating the sensed RF signals by computing the probability that each RE tracked object is one of a predetermined number of possible object types, to thereby form an RF confusion matrix. Objects of the cloud are sensed with an optical (IR) sensor at a location different from the location of the RF sensor, to thereby generate sensed optical signals for at least some of the objects of the cloud. The sensed optical signals are discriminated by computing the probability that each optical tracked object is one of a predetermined number of possible object types to thereby form an optical confusion matrix. RF tracked object data and optical tracked object data are correlated to provide a RF/IR correlation matrix data set indicative of the confidence or probability that the $i^{th}$ RE tracked object is correlated or matched with the $j^{th}$ IR tracked object. In exemplary embodiments, correlation may be performed using a common RF and IR metric, such as position or velocity, for each tracked object of each sensor, and may be based on computing the maximum likelihood or Mahalanobis distance of every combination of tracked RF and IR objects. Joint probabilities are calculated for all pairs of RE and optical signals and over all objects according to the RF and IR probability matrix data sets and the RF/IR correlation matrix data set. The joint probabilities are normalized over all object types to produce a matrix set of normalized joint probabilities. Marginal probabilities of the joint RF/IR discrimination results are calculated to produce a vector set of marginal optical probabilities. The vector set of marginal probabilities is normalized over all object types to thereby produce a vector set of normalized marginal optical probabilities. The object of interest is selected to be the IR object of the vector set of normalized marginal optical probabilities with the highest probability of being the object type of interest. In one mode of the method, the selected object is provided to an interceptor missile for aiding in guiding an interceptor missile toward the object of interest.

A system according to another aspect of the disclosure is for identifying an object of interest in a cloud of remote objects of different types, where the number of object types is limited. The system comprises an electromagnetic sensor observing the cloud, for generating electromagnetic or RF signals representing the objects of the cloud, and an electromagnetic discriminator coupled to the electromagnetic sensor for computing the probability of each RF tracked object being one of the possible object types. An optical sensor observes at least portions of the cloud, for generating optical signals representing at least some objects of the cloud, and an optical discriminator computes the probability of each IR tracked object being one of the possible object types. An electromagnetic-optical correlator is coupled to the electromagnetic discriminator and to the optical sensor, for determining the probability that the $i^{th}$ electromagnetic object is correlated or matched with the $j^{th}$ optical object. A processor is coupled to the electromagnetic discriminator, to the optical discriminator, and to the electromagnetic-optical correlator, for (a) generating an electromagnetic/optical correlation matrix, (b) calculating joint probabilities for all pairs of electromagnetic and optical signals and all types of objects, (c) normalizing the joint probabilities over all object types to produce a matrix set of normalized joint probabilities, (d) calculating marginal probabilities for each optical object, (e) normalizing the marginal probabilities for each optical object and over all object types, and (f) selecting as the object of interest the optical object with the highest normalized probability.

In a further aspect, a method comprises the steps of: receiving RF probability data indicative of a probability that an object being tracked by an RF sensor is one of a predetermined number (X) of possible object types; receiving IR probability data indicative of a probability that an object being tracked by an optical sensor is one of the predetermined number (X) of possible object types; receiving RF and IR correlation data indicative of correlations between pairs of objects consisting of one of the RF objects being tracked and one of the IR objects being tracked, corresponding to a probability that the $i^{th}$ RF object being tracked is matched with the $j^{th}$ IR object being tracked; determining via a computer processor, based on the received RF probability data, the IR probability data, and the RF and IR correlation data, data indicative of joint probabilities for all pairs of the RF objects being tracked and the IR objects being tracked; normalizing the joint probability data over all object types to produce data sets of normalized joint probabilities; determining marginal probabilities based on the normalized joint probabilities data sets to produce a data set of marginal optical probabilities representative of the probability that a given IR object is of a given object type, independent of which RF object the given IR object corresponds to; normalizing the data set of marginal optical probabilities over all object types to thereby produce a data set of normalized marginal optical probabilities; and determining the IR object of the data set of normalized marginal optical probabilities having the highest probability for the object type of interest to be the guide-to object. Further, the method comprises providing information of the determined guide-to object to an interceptor missile for aiding in guiding the interceptor missile toward the guide-to object.

BRIEF DESCRIPTION OF THE DRAWINGS

FIGS. 5, 6 and 7 tabulate parameters for first, second, and third examples, respectively.

DESCRIPTION OF THE INVENTION

According to an aspect of the disclosure, an explicit, probabilistic, real-time target object selection system is based on multi-sensor discrimination and correlation. This multi-sensor discrimination and correlation system improves the probability of discriminating and negating or successfully engaging the object of interest in situations in which the RF and the IR sensors do not have a common picture (i.e. where mismatch of objects and correlation of objects between sensors are not known to a high confidence).

The selection system or method is called "EXplicit Probabilistic Object Selection and Engagement System" (EXPOSES). It is explicit in the sense that no heuristic algorithm is used, and in that the probabilities are combined using explicit probability rule sets. The system of the disclosure is described in the context of a missile weapon system. However, it should be noted that the method could be used in any application where multiple probabilities from varying sensors or sources need to be combined in an "optimal" sense, factoring in the confidence levels of each source or sensor.

Figure 1:
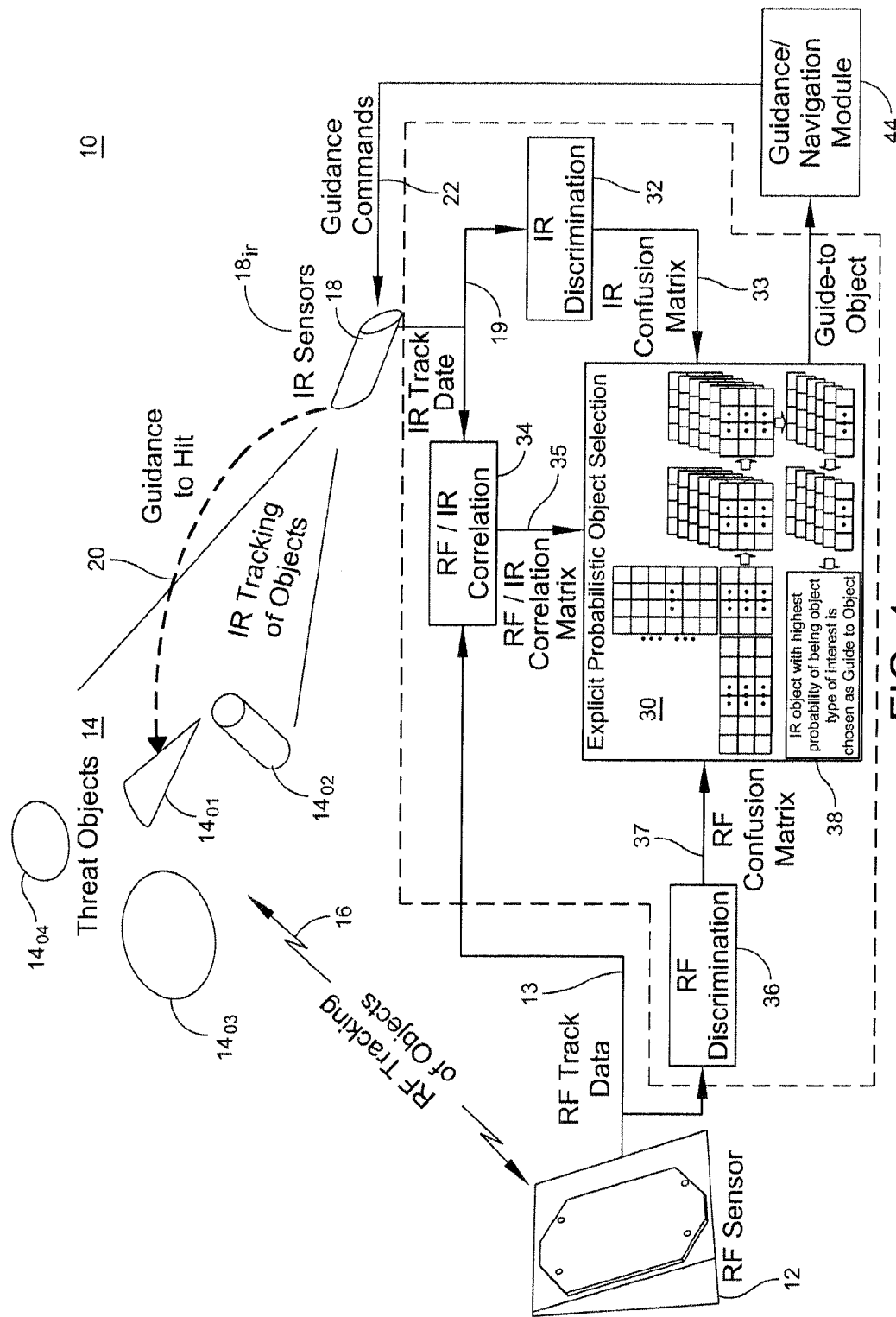
FIG. 1 is a simplified block diagram illustrating a system including an object sensing and discrimination arrangement and a threat engagement arrangement reliant on the discrimination arrangement.
Figure 2:
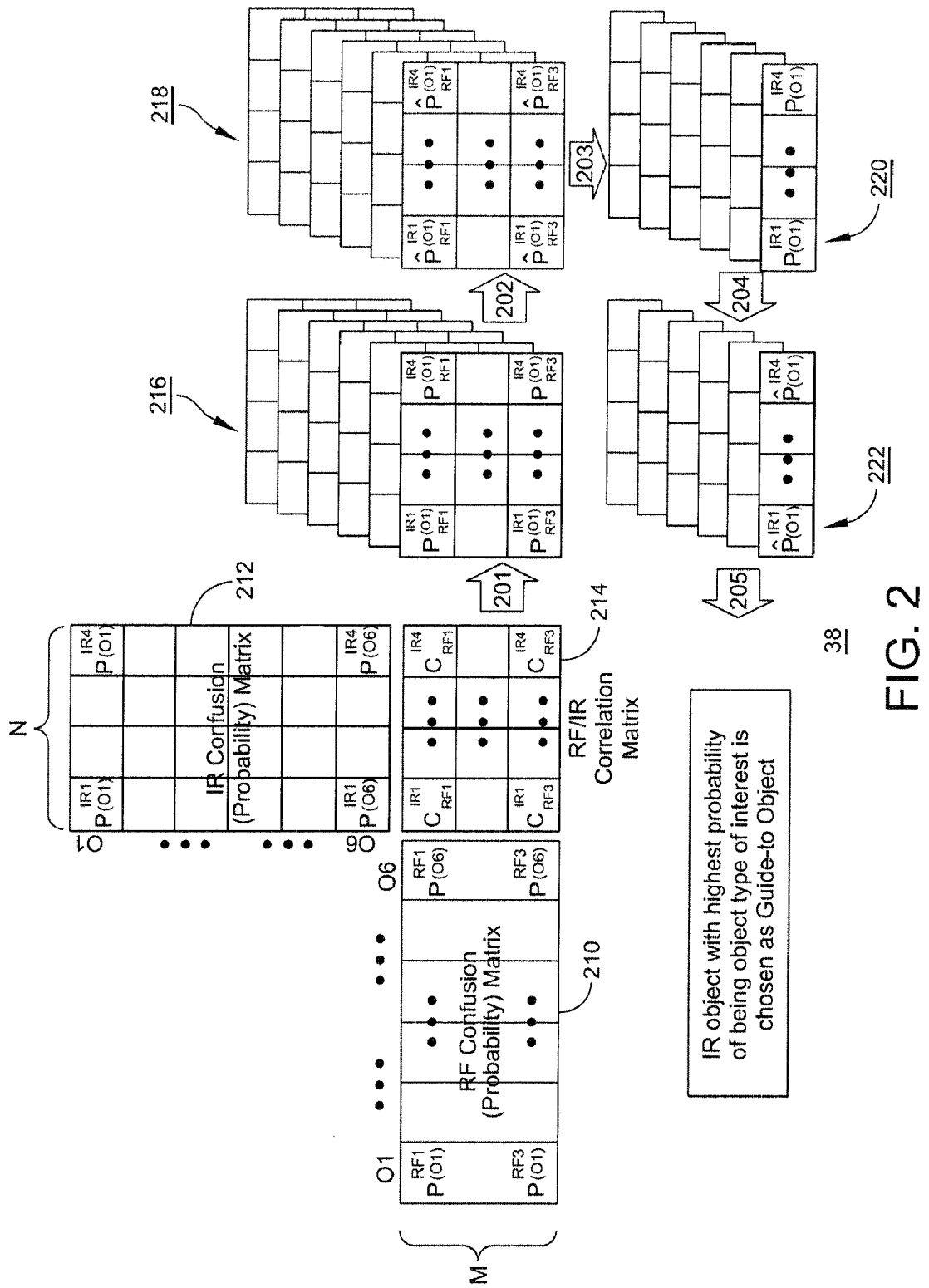
FIG. 2 is a representation of a portion of the discrimination arrangement of FIG. 1.
Figure 3:
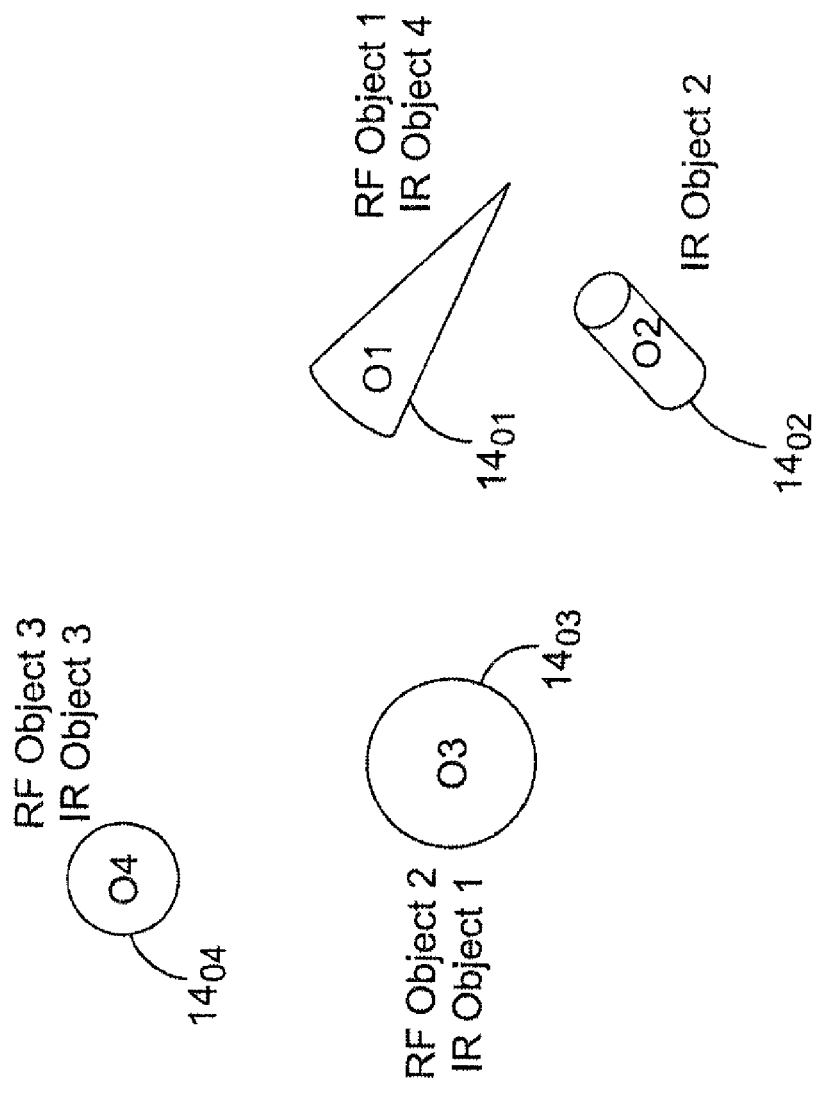
FIG. 3 is a notional representation of the objects to be discriminated.

In FIG. 1, a scenario 10 includes a radio-frequency sensor 12 such as a radar system, which tracks a cloud 14 of objects $14_{O1}$, $14_{O2}$, $14_{O3}$, and $14_{O4}$ by means of one or more radio-frequency (RE) radar beams, illustrated by a "lightning bolt" symbol 16. Sensor 12 may be on the Earth's surface (land or sea) rather than airborne. The cloud 14 may originate from a hostile missile, one portion of which, after deployment, may be manifested as object $14_{O2}$. The radar sensor system 12 produces RF track data, which is made available to an object selection and discrimination system designated generally as 30 and which includes an RF discrimination system designated generally as 36 and an RF/IR correlation system designated generally as 34. Object $14_{O1}$ of cloud 14 of FIG. 1 is illustrated as a conical object, suggesting that it is the reentry device against which action is to be taken; details of the cloud or set 14 are illustrated in FIG. 3. Also in FIG. 1, an antimissile missile or interceptor missile 18 is illustrated as being guided along a guidance track 20 by guidance commands transmitted over a path 22 from a guidance/navigation module illustrated as a block 44. Interceptor missile 18 is fitted with an optical or infrared sensor 18ir, which generates infrared tracking data relating to those objects of cloud 14 within its field of view. The infrared tracking data is applied by way of a path 19 to an IR discriminator illustrated as a block 32 and to RF/IR correlation block 34 of object sensing and discrimination system 30. RF/IR correlation block 34 also receives RF track data from RF sensor 12 by way of a path 13. Object selection and discrimination system 30 of FIG. 1 also includes an RF discrimination function illustrated as a block 36, which receives RF track data by way of path 13. A probabilistic object selection function illustrated as block 38 receives discriminated infrared information from block 32 by way of a path 33, discriminated RF information from block 36 by way of a path 37, and RF/IR correlation information from block 34 by way of a path 35. Details of probabilistic object selection function block 38 are illustrated in FIG. 2. The threat objects of set 14 deployed from the hostile missile are tracked by both RF sensor 12 and IR sensor 18ir. The EXPOSES method fuses RF and IR tracked object discrimination probabilities to select the object of interest and to identify the guide-to object (in this case, the guide-to object is conical element $14_{o1}$). Finally, the interceptor missile is guided toward the object of interest. The interceptor missile is guided toward the selected object for the purpose of hitting and killing it using the kinetic energy of the collision, or at least bringing the interceptor missile within a range in which an explosive charge can be effectively used.

As shown in FIG. 1, the deployed threat and decoy objects of set 14 are tracked by both RF and IR sensors. The same object may not be tracked by each sensor, and also the number of objects may not be equal in the Field of View (FOV) of each tracking sensor. The lack of exact correspondence between the number of objects tracked by the RF and optical sensors may be attributable, in part, to the time required for the RF sensor to scan over its field-of-view, including the cloud, and to the limited and continually-changing field of view of the optical sensor. The discrimination function and algorithm represented by selection and engagement system 30 computes the tracked object discrimination probability using tracking data from the various sensors. The EXPOSES system uses the outputs of the IR and RF discrimination algorithms of blocks 32 and 36 to identify the object types of the RF and IR tracked objects. The RF and IR discrimination processing is described below. It should be noted that the various processing blocks, namely blocks 32, 34, 36, 38, and 44 of FIG. 1 may be located at the site of RF sensor 12, at the interceptor missile 18, or at some other location, the only requirement being that the communication delays be sufficiently short to allow proper operation. Those skilled in the art will appreciate that embodiments of the invention may be practiced with various computer system configurations, including multi-processor systems, microprocessor-based or programmable electronic devices, network PCs, minicomputers, mainframe computers and the like. The invention may be practiced in distributed computing environments where tasks are performed by remote processing devices that are linked through a communications network as discussed herein. In a distributed computing environment, program modules may be located in local and remote memory storage devices. Suitable computer program code may be provided for performing the functions described herein such as RF discrimination, IR discrimination, RF/IR correlation, probabilistic object selection and engagement, guidance and navigation, and other calculations illustrative of the type of functions which may be performed by computer program code embodiments of the present invention. By way of non-limiting example only, interceptor missile 18 may include the functionality associated with processing blocks 32 (IR discrimination), 34 (RF/IR correlation), 38 (explicit probabilistic object selection) and 44 (guidance/navigation) with communication paths 19, 22, 33, and 35 being typical electrical (including optical) communications media for communicating information within interceptor missile 18. RF data from the RF sensor 12 (including RF probability data from RF discriminator 36) located remotely from interceptor missile 18 may be communicated to interceptor missile 18 via one or more radio links (e.g. paths 13, 37). In another embodiment, the RF sensor 12, IR sensor 18*ir* and corresponding processing blocks 32, 34, 36, 38, 44 are located at interceptor missile 18 with corresponding electrical and/or optical communications pathways for establishing communications within interceptor missile 18, as is understood by one of ordinary skill in the art.

In the arrangement of FIG. 1, the initial RF discrimination is performed by block 36 using RF measurements from RF sensor 12. The RF discrimination algorithm computes the probability of each RF tracked object being one of X possible object types, where the X object types are denoted by O1, . . . , Ox. This process is well known in the art of object discrimination. A corresponding computer processor (e.g. CPU) and associated data storage device (e.g. memory) may be used for implementation of RF discriminator 36. The data storage device may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein. The term "computer-readable medium" as used herein refers to any medium that provides or participates in providing instructions to the processor of the computing device (or any other processor of a device described herein) for execution. Such a medium may take many forms, including but not limited to, non-volatile media, non-transitory media, tangible media, volatile media, and transmission media. Non-volatile media and tangible media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

The RF discrimination algorithm of block 36 of FIG. 1 is explained with the assumption that X, the number of object types, is limited to a maximum of six (6). Number of object types X is limited to be 6 without loss of generality of the discussion. The RF discrimination probabilities represent the probability that any RF object of cloud 14 is one of the 6 object types (O1, O2, O3, O4, O5, and O6). Note that for any object, the sum of probabilities over all object types must be equal to one. In one embodiment, the RF discrimination confusion matrix information from the RF discriminator 36 is passed to the missile in flight via a radio link, path 37. Note that the RF discriminator 36 could be either ground or air based.

As mentioned, the scenario of FIG. 1 depicts a missile weapon system in which the IR sensor on board the interceptor missile independently provides IR tracking data through path 19 to the IR discrimination system 32. IR discrimination system 32 performs IR discrimination based on the IR measurements. The IR discrimination algorithm computes the probability of each IR tracked object being one of the same X possible object types. The IR discrimination probabilities represent the probability that any IR object is one of the 6 object types (O1, . . . , O6). A corresponding computer processor (e.g. CPU) and associated data storage device (e.g. memory) may be useful for implementation thereof. The data storage device may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein.

As mentioned, the number of objects being tracked by the IR sensor is not, in general, the same as the number of objects being tracked by the RF sensor since the detection characteristics of an RF sensor and IR sensor are different. However, in general, at least one object from the primary objects of interest (i.e. O1, O2, O3, etc.) should be sensed in common between the RF and IR sensors, and this commonality is exploited by the EXPOSES processing.

FIG. 1 depicts as a block 34 an interceptor missile weapon system RF/IR correlation algorithm. This algorithm is advantageously performed on board the interceptor missile 18 because it reduces the data transmission requirements, thereby limiting RF data to be transmitted up to the missile only, instead of having to transmit IR data down to the RF system, and then having to pass the results of the RF/IR correlation system back to the missile. The result of the RF/IR correlation algorithm in block 34 is an M×N RF/IR correlation matrix (where M denotes the number of RF objects being tracked and N denotes the number of IR objects being tracked). The M×N RF/IR correlation matrix represents the confidence or probability that the $i^{th}$ RF object is correlated or matched with the $j^{th}$ IR object. The M×N RF/IR correlation matrix is applied from RF/IR correlation block 34 to RF Confusion matrix from block 36 by way of a path 35. The correlation in block 34 can be performed using a common RF and IR metric, such as position or velocity, for each tracked object of each sensor, and may be based on computing the maximum likelihood or Mahalanobis distance of every combination of RF and IR objects. If an RF object and an IR object cannot be correlated with a high level of confidence, then the correlation is low for that pairing and results in a low correlation probability within the correlation matrix. A corresponding computer processor (e.g. CPU) and associated data storage device (e.g. memory) may be used for implementation of RF/IF correlator 34. The data storage device may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein. If an RE object and an IR object cannot be correlated with a high level of confidence, one would expect the discrimination results from the IR sensor to weigh heavily in the object selection decision; alternately, if the correlation is high for an RF object and IR object pairing, one would expect the fused discrimination results to be an optimal blend between the RF and IR discrimination results. The EXPOSES algorithm is manifested in the processing of block 30 of FIG. 1. The EXPOSES algorithm guarantees optimal blending between the RF and IR discrimination results depending on the RF/IR correlation confidences.

The EXPOSES algorithm of block 38 of FIGS. 1 and 2 combines the RF and IR tracked object discrimination probabilities using explicit probability rule sets. The inputs to the EXPOSES algorithm of block 38 of FIG. 1 are (a) RF sensor discrimination probability from block 36, (b) IR sensor discrimination probability from block 32, and (c) the RF/IR correlation matrix from block 34. A corresponding computer processor (e.g. CPU) and associated data storage device (e.g. memory) may be used for implementation of block 38. The data storage device may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein.

Figure 4:
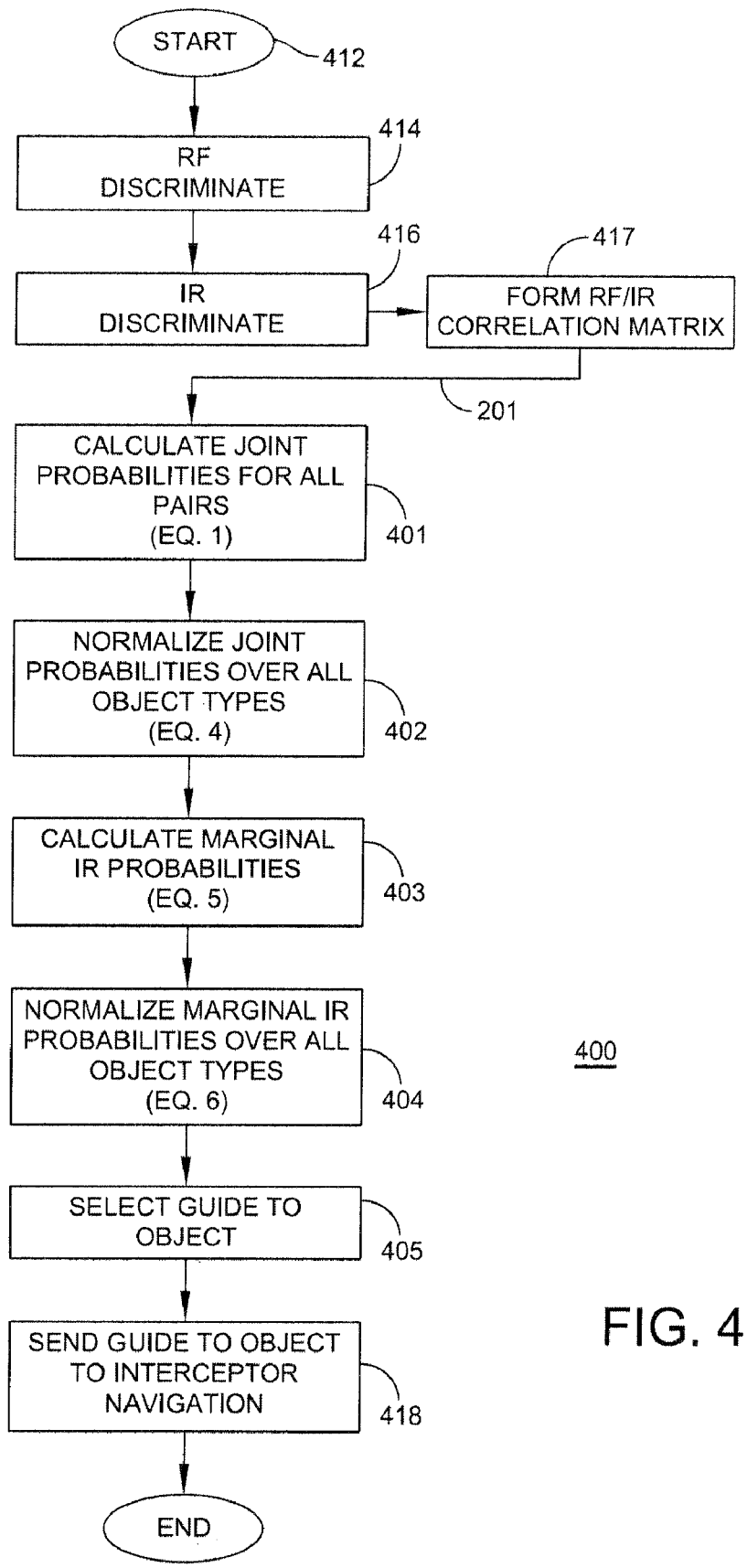
FIG. 4 is a simplified logic flow chart or diagram illustrating processing steps according to aspects of the disclosure.

FIG. 4 illustrates a logic or command flow chart or diagram 400 illustrating processing associated with aspects of the disclosure. In FIG. 4, the logic 400 starts at a START block 412, and flows to a block 414. Block 414 of FIG. 4 represents the RE discrimination of RF object track data performed in block 36 of FIG. 1 resulting in the RF probability matrix 210 of FIG. 2. From logic block 414, the logic 400 of FIG. 4 flows to a logic block 416. Logic block 416 represents the optical or IR discrimination of IR object track data performed in block 32 of FIG. 1 resulting in the IR probability matrix 212 of FIG. 2. Block 417 represents the forming of an RF/IR correlation matrix (214 of FIG. 2) based on the RF and IR object track data, an RF confusion or probability matrix (210 of FIG. 2), and an IR confusion or probability matrix (212 of FIG. 2). It is to be understood, that the logic flow blocks 414 and 416 are independent processing blocks and hence not sequentially related, but illustrated herein merely for convenience. Likewise, the RF/IR correlation matrix data set depicted in processing block 417 is dependent upon the RF track data and IR track data only. FIG. 4 further illustrates that the EXPOSES block 38 of FIG. 1 uses a five-step process to combine RF and IR probabilities and correlation inputs in order to select the guide-to object (the object of interest in the cloud). The five-step process performed in block 38 of FIGS. 1 and 2 is also illustrated by blocks 401 through 405 in the logic or command flow diagram or chart 400 of FIG. 4. First, the probabilities and correlations are applied to logic block 401, as suggested by path 201, and are used to calculate joint probability matrices for all object pairs, one for each object type, as suggested by block 401 of FIG. 4. This results in matrix set 216 (FIG. 2) of joint probabilities. These joint probabilities are applied by way of a path 202 to a logic block 402, representing the normalization over all object types. The normalized joint probabilities 218 (FIG. 2) are passed, by a logic path 203, to a further logic block 403. In the third step, represented by logic block 403 of FIG. 4, the marginal probabilities 220 (FIG. 2) for each IR object are calculated. The logic 400 flows by path 204 to a further block 404, where these probabilities are once again normalized (222 of FIG. 2). Block 405 of logic 400 receives the twice-normalized marginal probabilities by way of a logic path 205. Finally, in the fifth step of the EXPOSES algorithm, the IR object with the highest probability of being the object type of interest is selected as the guide-to object, as suggested by logic block 405 of FIG. 4. The following sections describe each of the five steps in greater detail. The last significant step of logic flow 400 of FIG. 4 is to identify the guide-to object to the guidance/navigation module of block 44 of FIG. 1, as suggested by block 418 of FIG. 4.

As mentioned, the inputs to the EXPOSES algorithm of block 38 of FIGS. 1 and 2 are (a) RF sensor discrimination probability from block 36, (b) IR sensor discrimination probability from block 32, and (c) the RF/IF correlation matrix from block 34. In FIG. 2, matrix 210 represents the RF confusion or probability matrix, and matrix 212 represents the IR confusion or probability matrix. Matrix 214 of FIG. 2 represents the RF/IR correlation matrix.

The EXPOSES process of logic block 401 of FIG. 4 begins by calculating joint probabilities for each possible pair of an RF object and an IR object, taking their correlation into account. For M number of RF objects and N number of IR objects, this results in matrix set 216 of FIG. 2, which is an N×N matrix of joint probabilities for each object type. The joint probabilities are calculated using the equation $$P_{ij}^{Fused}(k) = P_j^{IR}(k)[1 - c_{ij}(1 - P_i^{RF}(k))] \tag{1}$$

where:
i is the RF object;
j is the IR object;
k is the object type; and
$c_{ij}$ is the correlation between RF object i and IR object j, or the probability that they are the same object. Equation 1 is used to calculate the joint probability instead of a simple product of $P^{RF}$, $P^{IR}$, and $c$ because of the desired effect of the correlation term. When there is a perfect correlation of one between the RF and IR objects, equation 1 simplifies to $$P_{ij}^{Fused}(k) = P_i^{RF}(k) P_j^{IR}(k) \tag{2}$$

which is the same as the fused probability that would result from a simple product. When there is perfect correlation certainty that RF object i is the same object as IR object j, the joint probability of matrix set 216 results in the product of their posterior probabilities. When there is zero correlation between a pair of objects, the simple product results in a fused probability of zero, even if the IR discrimination algorithm has assigned a high probability to the IR object. The EXPOSES joint probability, on the other hand, reduces to $$P_{ij}^{Fused}(k) = P_j^{IR}(k) \tag{3}$$

when there is zero correlation between the pair of objects. In other words, when there is zero correlation between the objects, the RF probabilities do not contribute any information to the missile's decision on which object to engage. Therefore, the interceptor missile should rely on its own discrimination algorithm to assign a probability to that IR object. This may be important in situations in which there is poor correlation between all pairs of objects, which can happen if there are large measurement errors or sensor biases. In these situations, the missile should rely on its own IR discrimination rather than making all the fused probabilities very small due to poor correlation.

The next or second step 402 in the EXPOSES process of logic flow chart 400 is to normalize the joint probabilities for each pair of objects over all possible object types. This corresponds in FIG. 2 to the progression represented by arrow 202 from matrix set 216 to matrix set 218. Matrix set 218 is the matrix set of normalized joint probabilities. The equation for this normalization is $$\hat{P}_{ij}^{Fused}(k) = \frac{P_{ij}^{Fused}(k)}{\sum_{l=1}^{X} P_{ij}^{Fused}(l)} \tag{4}$$

where X is the number of object types. This corresponds to a depth-wise normalization of each cell position in the matrices of set 216 of FIG. 2. This normalization is needed because of the way posterior probabilities are calculated or constructed. In the RF confusion matrix 210 and the IR confusion matrix 212, each object has the constraint that the sum of its posterior probabilities across all object types must be unity or one. The same is true of each pair of objects in the joint probability matrices: the sum of all joint probabilities for that pair of objects across all object types should be one. Unless an object pair has zero correlation, the sum of its non-normalized joint probabilities will be less than one. Without normalization, this would have the effect of penalizing highly correlated objects, even if the object is assigned a high probability from both sensors. For example, two perfectly correlated objects with probabilities of 0.9 would have a joint probability of $P_{ij}^{Fused}(k) = P_i^{RF}(k) P_j^{IR}(k)$ or 0.81. However, if the same two objects had zero correlation, the joint probability would be $P_{ij}^{Fused}(k) = P_j^{IR}(k)$ or 0.9. Normalization increases the joint probability of the perfectly correlated pair to a value larger than 0.9 instead of decreasing it.

The next or third step in the EXPOSES algorithm calculates marginal optical probabilities. This step corresponds to block 403 of FIG. 4, and is represented in FIG. 2 by arrow 203 representing the transition from matrix set 218 to vector set 220. Vector set 220 is the vector set of marginal optical probabilities. For each object type, the matrix of normalized joint probabilities can be viewed as a joint probability mass function (PMF) of i and j. It should be noted that since the probabilities in the matrix of normalized joint probabilities do not necessarily sum to one, it does not technically meet the definition of a joint PMF. However, viewing it as a joint probability mass function (PMF) gives a useful framework for combining the joint probabilities in a meaningful way. Given a joint PMF of i and j, the marginal PMF of j is given by $$P_j^{Fused}(k) = \sum_{i=1}^{M} \hat{P}_{ij}^{Fused}(k) \tag{5}$$

which simply results in a row vector containing the sums of each column. This sum gives the total probability that IR object j is of object type k, regardless of which RF object or objects it might correspond to.

The next or fourth step in the EXPOSES process, corresponding to logic block 404 of FIG. 4, and also corresponding to arrow 204 of FIG. 2 defining the transition from vector set 220 to vector set 222, is the normalization of the marginal optical probabilities calculated in conjunction with block 403 of FIG. 4. After calculating the marginal probabilities for each IR object, the marginal probabilities must once again be normalized across all object types. In FIG. 2, this is again a depth-wise normalization of each cell in vector set 220. The normalization is given by $$\hat{P}_j^{Fused}(k) = \frac{P_j^{Fused}(k)}{\sum_{l=1}^{X} P_j^{Fused}(l)} \tag{6}$$

where X is again the total number of object types. Normalization guarantees that for each IR object, the sum of posterior probabilities over all objects is equal to unity or one.

Finally, a fifth step, corresponding to logic step or block 405 of FIG. 4 and to arrow 205 of FIG. 2, completes the EXPOSES process. Arrow 205 of FIG. 2 expresses the transition from vector set 222 of normalized marginal probabilities to the selection of a single optical object. The EXPOSES process ends with selection of the guide-to object from the vector set 222 of normalized marginal IR probabilities. From the vector of normalized marginal IR probabilities for the object type of interest, the IR object with the highest probability is selected or chosen as the guide-to object. This selected object is then used by the missile guidance and navigation module to calculate guidance commands for the missile in flight, as suggested by logic step or block 418 of FIG. 4. In one embodiment, the EXPOSES processor is configured to output a signal representative of the selected object of interest to the guidance and navigation module for guiding an interceptor missile toward the selected object.

The Guidance/Navigation module 44 of FIG. 1 receives the Guide-to-Object output from the EXPOSES Object Selection algorithm 38 and generates guidance commands which are passed by way of a path 22 to the interceptor missile 18. The guidance commands are used to point the IR sensor 18ir to the guide-to-object, and to guide the interceptor missile 18 to the object of interest for the engagement thereof. This engagement may be for the purpose of hitting and killing it using the kinetic energy of the collision or for bringing the interceptor within lethal range of the selected object. The Guidance/navigation module 44 may comprise a corresponding computer processor (e.g. CPU) and associated data storage device (e.g. memory) useful for implementation thereof. The data storage device may store, for example, (i) a program (e.g., computer program code and/or a computer program product) adapted to or configured to direct the processor in accordance with embodiments of the present invention, and (ii) a database adapted to store information that may be utilized to store information required by the program. The program may be stored, for example, in a compressed, an uncompiled and/or an encrypted format, and may include computer program code. The instructions of the program may be read into a main memory of the processor from a non-transitory computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of embodiments of the present invention. Thus, embodiments of the present invention are not limited to any specific combination of hardware and software. The computer program code required to implement the functions described herein can be developed by a person of ordinary skill in the art, and is not described in detail herein.

The performance of EXPOSES is illustrated using three numerical examples. FIG. 3 depicts the deployed threat object scene of a hostile missile that contains at most 6 distinct object types, O1 through O6. Note that while it is not illustrated here, it is possible to have multiple objects of the same type within the same threat object scene. Here, three objects are tracked by the RF sensor and four objects are tracked by the IR sensor, with object types O1, O3, and O4 in common between the two sensors, and object type O6 seen only by the IR sensor. The objective in these examples is to discriminate and guide to the object type of interest, O1. The same RF/IR correlation matrix is used in all three examples. The correlation matrix indicates that RF object #1 is highly correlated with IR object #4, RF object #2 is highly correlated with IR object #1, and RF object #3 is highly correlated with IR object #3. IR object #2 is not detected by the RF sensor.

FIG. 3 depicts the scenario used for all three numerical examples of EXPOSES. FIG. 5 tabulates parameters for the first example. More particularly, FIG. 5 tabulates (a) RF/IR correlation matrix, (b) IR confusion matrix, (c) RF confusion matrix, and (d) fused RF/IR results, which are the EXPOSES output. In this scenario, the IR confusion matrix indicates that IR object #1 has an 84% probability of being object type O3, IR object #2 has a 25% probability of being object type O4 and a 25% probability of being object type O5, IR object #3 has an 84% probability of being O4, and IR object #4 has an 84% probability of being O1 (the object of interest). In this first example, the RF confusion matrix indicates that RF object #1 has a 95% probability of being O1 (the object type of interest), RF object #2 has a 95% probability of being O3, and RF object #3 has a 95% probability of being O4. The fused RF/IR results using the EXPOSES algorithm show that the probability of IR object #4 being the object type of interest O1 is increased from 84% to 89%. Note that if only the IR discrimination results were used from the IR discrimination algorithm, then the probability assigned to IR object #4 being O1 would be only 84%. This example demonstrates that using EXPOSES algorithm to fuse the RF and IR discrimination results, taking into account the RF/IR correlation performance, enhances the level of confidence in selecting the correct object of interest.

FIG. 6 tabulates input parameters and EXPOSES results for example 2. In this example, the IR confusion matrix indicates that IR object 1 has a 25% probability of being O1 (the object type of interest), a 25% probability of being O2, and a 25% probability of being O3. IR object 2 has a 25% probability of being O6. IR object 3 has a 25% probability of being O4 and a 25% probability of being O5. IR object 4 has a 25% probability of being O1 (the object type of interest), a 25% probability of being O2, and a 25% probability of being O3. In this example, the IR discrimination algorithm is not able to definitively discriminate any of the IR objects. The RF confusion matrix indicates that RF object #1 has a 95% probability of being O1, RF object #2 has a 95% probability of being O3, and RF object #3 has a 95% probability of being O4. The fused RF/IR results using the EXPOSES algorithm show that the probability of IR object #4 being the object type of interest O1 is increased from 25% to 48%. This demonstrates that when the RF sensor can discriminate the object type of interest but the IR sensor cannot, EXPOSES can exploit this information to select the proper IR object as the guide-to object.

FIG. 7 tabulates input parameters and EXPOSES results for example 3. In this example, the IR confusion matrix is the same as in example 2. In the RF confusion matrix of example 3, only RF object #2 is definitively discriminated; it has a 95% probability of being object type O3. In this example, neither the IR sensor nor the RF sensor can definitively discriminate any object as being the object type of interest O1, and the IR sensor cannot distinguish between O1, O2, and O3 for the true object of interest (IR object #4). However, since the RF sensor can clearly discriminate RF object #2 as O3 to a high level of confidence (95%), the resulting fused probabilities from EXPOSES result in the system being able to uniquely identify IR object #4 as being the object type of interest O1. In this case, EXPOSES is able to exploit the RF discrimination information to make the correct selection, even though the RF sensor cannot discriminate the object type of interest. Thus, without RF/IR fusion using the EXPOSES algorithm, the IR sensor would have a difficult time selecting the object of interest in this example.

Thus, with reference to FIG. 1 in conjunction with FIG. 2 and FIG. 4, a method according to an aspect of the disclosure for selecting an object of interest in a cloud or set (14) of objects of lesser interest comprises the steps of sensing objects of the cloud with an electromagnetic or radio-frequency (RF) sensor (12) (FIG. 1) at a location, to thereby generate sensed RF signals for at least some of the objects of the cloud, and discriminating (414) (FIG. 4) the sensed RF signals by computing the probability that each RF tracked object is one of a predetermined number (X) of possible object types, to thereby form an RF confusion matrix (210) (FIG. 2). Objects of the cloud are sensed with an optical (IR) sensor (18ir) at a location different from the location of the RF sensor (12), to thereby generate sensed optical (IR) signals for at least some of the objects of the cloud. The sensed optical signals are discriminated (416) by computing the probability that each optical tracked object is one of a predetermined number (X) of possible object types to thereby form an optical confusion matrix (212). RF tracked object data and optical tracked object data are correlated to provide a RF/IR correlation matrix data set indicative of the confidence or probability that the $i^{th}$ RF tracked object is correlated or matched with the $j^{th}$ IR tracked object. Joint probabilities are calculated (401) for all pairs of RF and optical signals and over all objects (216) according to the RF and IR probability matrix data sets and the RF/IR correlation matrix data set. The joint probabilities are normalized over all object types (402) to produce a matrix set of normalized joint probabilities (218). Marginal probabilities of the joint RF/IR discrimination results (403) are calculated to produce a vector set of marginal optical probabilities (220). The vector set of marginal probabilities is normalized over all object types (404) to thereby produce a vector set of normalized marginal optical probabilities (222). The object of interest is selected to be the IR object of the vector set of normalized marginal optical probabilities with the highest probability of being the object type of interest. In one mode of the method, the selected object is provided to an interceptor missile for aiding in guiding an interceptor missile toward the object of interest.

A system according to another aspect of the disclosure is for identifying an object of interest in a cloud or set (14) of remote objects of different types, where the number of object types is no greater than X. The system comprises an electromagnetic sensor (12) observing the cloud, that generates electromagnetic or RF signals representing the objects of the cloud, and an electromagnetic discriminator (32) coupled to the electromagnetic sensor (12) that computes the probability of each RF tracked object being one of the X possible object types. An optical sensor (18ir) observes at least portions of the cloud, and generates optical signals representing at least some objects of the cloud, and an optical discriminator (32) computes the probability of each IR tracked object being one of the X possible object types. An electromagnetic/optical correlator (34) is coupled to the electromagnetic discriminator (36) and to the optical sensor (18ir), and configured to determine the probability that the $i^{th}$ electromagnetic object is correlated or matched with the $i^{th}$ optical object. A processor (38) (e.g. a computer processor such as a microprocessor or CPU) is coupled to the electromagnetic discriminator (32), to the optical discriminator (32), and to the electromagnetic/optical correlator (34), and configured for (a) generating an electromagnetic/optical correlation matrix, (b) calculating joint probabilities (401) for all pairs of electromagnetic and optical signals and all types of objects (216), (c) normalizing the joint probabilities over all object types (402) to produce a matrix set of normalized joint probabilities (218), (d) calculating marginal probabilities (403) for each optical object, (e) normalizing the marginal probabilities (404) for each optical object and over all object types, and (f) selecting as the object of interest the optical object with the highest normalized probability.

While particular embodiments of the invention have been illustrated and described in accordance with missile weapons systems, various modifications and combinations can be made without departing from the spirit and scope of the invention, and all such modifications, combinations, and equivalents are intended to be covered and claimed.

What is claimed is:

1. A method for selecting an object of interest in a cloud of objects of lesser interest, said method comprising the steps of:
    sensing objects of said cloud with a radio-frequency (RF) sensor at a location, to thereby generate sensed RF signals for at least some of said objects of said cloud;
    discriminating said sensed RF signals by computing the probability that each RF tracked object is one of a predetermined number (X) of possible object types, to thereby form an RF confusion matrix;
    sensing objects of said cloud with an optical sensor at a location different from the location of said RF sensor, to thereby generate sensed optical signals for at least some of said objects of said cloud;
    discriminating said sensed optical signals by computing the probability of each optical tracked object is one of a predetermined number (X) of possible object types to thereby form an optical confusion matrix;
    calculating the correlations between all pairs of objects consisting of one RF object and one IR object to thereby form an RF/IR correlation matrix;
    calculating joint probabilities for all pairs of RE and optical signals and all objects to produce a matrix set of joint probabilities;
    normalizing said joint probabilities over all object types to produce a matrix set of normalized joint probabilities;
    calculating marginal probabilities of the joint RF/IR discrimination results to produce a vector set of marginal optical probabilities;
    normalizing said vector set of marginal optical probabilities over all object types to thereby produce a vector set of normalized marginal optical probabilities; and
    selecting a guide-to object as the IR object of said vector set of normalized marginal optical probabilities with the highest probability of being the object type of interest.

2. A method according to claim 1, wherein the selected guide-to object is provided to an interceptor missile for aiding in guiding said interceptor missile toward said guide-to object.

3. A method according to claim 1, wherein said step of calculating joint probabilities for all pairs of RF and optical signals and all objects includes the step of calculating joint probabilities using the equation $$P_{ij}^{Fused}(k) = P_j^{IR}(k)[1-c_{ij}(1-P_i^{RF}(k))]$$

where:
    i is the RE object;
    j is the IR object;
    k is the object type; and
    $c_{ij}$ is the correlation between RF object i and IR object j, or the probability that they are the same object.

4. A method according to claim 1, wherein said step of normalizing said joint probabilities over all object types to produce a matrix set of normalized joint probabilities includes the step of calculating a depth-wise normalization of each cell position in the matrix set of normalized joint probabilities.

5. A method according to claim 1, wherein said step of normalizing said joint probabilities over all object types to produce a matrix set of normalized joint probabilities includes the step of calculating $$\hat{P}_{ij}^{Fused}(k) = \frac{P_{ij}^{Fused}(k)}{\sum_{l=1}^{X} P_{ij}^{Fused}(l)}$$

where X is the number of object types.

6. A method according to claim 1, wherein said step of calculating marginal probabilities of the joint RF/IR discrimination results to produce a vector set of marginal optical probabilities includes the step, given a joint probability mass function (PMF) of i and j, of calculating the marginal PMF by $$P_j^{Fused}(k) = \sum_{i=1}^{M} \hat{P}_{ij}^{Fused}(k).$$

7. A method according to claim 1, wherein said step of normalizing said vector set of marginal optical probabilities over all object types to thereby produce a vector set of normalized marginal optical probabilities includes the step of calculating normalization by $$\hat{P}_j^{Fused}(k) = \frac{P_j^{Fused}(k)}{\sum_{l=1}^{X} P_j^{Fused}(l)}$$

where X is again the total number of object types.

8. A method according to claim 1, wherein said step of selecting the guide-to object includes the determination, from the vector of normalized marginal IR probabilities for the object type of interest, the IR object with the highest probability, and deeming the IR object with the highest probability to be the guide-to object.

9. A system for identifying an object of interest in a cloud of remote objects of different types, where the number of object types is no greater than X, said system comprising:
   an electromagnetic sensor observing said cloud, and configured to generate RF signals representing at least some of the objects of said cloud;
   an electromagnetic discriminator coupled to said electromagnetic sensor and configured to compute the probability of each RF tracked object being one of the X possible object types;
   an optical sensor observing at least portions of said cloud, and configured to generate optical signals representing at least some objects of said cloud;
   an optical discriminator configured to compute the probability of each IR tracked object being one of the X possible object types;
   an electromagnetic/optical correlator coupled to said electromagnetic discriminator and to said optical sensor, and configured to determine the probability that the $i^{th}$ electromagnetic object is correlated or matched with the $j^{th}$ optical object;
   a processor coupled to said electromagnetic discriminator, to said optical discriminator, and to said electromagnetic/optical correlator, for (a) generating an electromagnetic/optical correlation matrix, (b) calculating joint probabilities for all pairs of electromagnetic and optical signals and all types of objects, (c) normalizing said joint probabilities over all object types to produce a matrix set of normalized joint probabilities, (d) calculating marginal probabilities for each optical object, (e) normalizing the marginal probabilities for each optical object and over all object types, and (f) selecting as the object of interest the optical object with the highest normalized probability.

10. The system of claim 9, wherein the processor is further configured to output a signal representative of the selected object of interest.

11. The system of claim 10, further comprising a guidance and navigation module responsive to the output signal of the processor for guiding an interceptor missile toward said selected object.

12. The system of claim 10, wherein the optical sensor is on said interceptor missile.

13. The system of claim 12, wherein said processor is on said interceptor missile.

14. The system of claim 13, wherein the RF sensor is ground based.

15. The system of claim 14, wherein the RF sensor is a radar system.

16. A method comprising the steps of:
   receiving RF probability data indicative of a probability that an object being tracked by an RF sensor is one of a predetermined number (X) of possible object types;
   receiving IR probability data indicative of a probability that an object being tracked by an optical sensor is one of said predetermined number (X) of possible object types;
   receiving RF and IR correlation data indicative of correlations between pairs of objects consisting of one said RF object being tracked and one said IR object being tracked, corresponding to a probability that the $i^{th}$ RF object being tracked is matched with the $j^{th}$ IR object being j tracked;
   determining via a computer processor, based on said received RF probability data, IR probability data, and RF and IR correlation data, data indicative of joint probabilities for all pairs of said RF objects being tracked and said IR objects being tracked;
   normalizing said joint probability data over all object types to produce data sets of normalized joint probabilities;
   determining marginal probabilities based on the normalized joint probabilities data sets to produce a data set of marginal optical probabilities representative of the probability that a given IR object is of a given object type, independent of which RF object the given IR object corresponds to;
   normalizing said data set of marginal optical probabilities over all object types to thereby produce a data set of normalized marginal optical probabilities; and
   determining the IR object of said data set of normalized marginal optical probabilities having the highest probability for the object type of interest to be the guide-to object.

17. A method according to claim 16, further comprising providing information of the determined guide-to object to an interceptor missile for aiding in guiding said interceptor missile toward said guide-to object.

* * * * *

UNITED STATES PATENT AND TRADEMARK OFFICE
CERTIFICATE OF CORRECTION

PATENT NO. : 8,378,880 B1
APPLICATION NO. : 13/243162
DATED : February 19, 2013
INVENTOR(S) : Jeffrey B. Boka, Naresh Raman Patel and Joseph P. Tadduni It is certified that error appears in the above-identified patent and that said Letters Patent is hereby corrected as shown below:

Column 14, Line 53, Claim 3, the word "RE" should read "RF".

Signed and Sealed this
Second Day of April, 2013

Teresa Stanek Rea
*Acting Director of the United States Patent and Trademark Office*